Dec. 9, 1969  H. SPERBER ETAL  3,483,214
PRODUCTION OF TRIOXANE
Filed Dec. 28, 1967
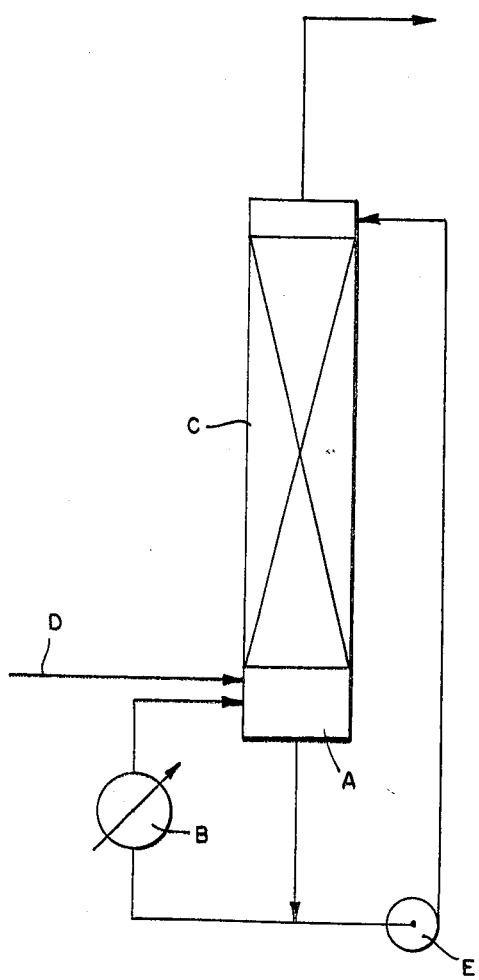
INVENTORS:
HEINRICH SPERBER
GERHARD SCHULZ
CHRISTOF PALM
WALDEMAR KOEHLER
BY
*Marzall, Johnston, Cook & Root*
ATT'YS _United States Patent Office_ 3,483,214
Patented Dec. 9, 1969

3,483,214
PRODUCTION OF TRIOXANE
Heinrich Sperber and Gerhard Schulz, Ludwigshafen (Rhine), and Christof Palm, Mannheim, and Waldemar Koehler, Ludwigshafen (Rhine), Germany, assignors to Badische Anilin- & Soda-Fabrik Aktiengesellschaft, Ludwigshafen (Rhine), Germany
Filed Dec. 28, 1967, Ser. No. 694,181
Claims priority, application Germany, Dec. 29, 1966, B 90,508
Int. Cl. C07d *19/00*
U.S. Cl. 260—340                    7 Claims

ABSTRACT OF THE DISCLOSURE

Production of 1,3,5-trioxane by heating a strongly acid aqueous solution of formaldehyde for a short time in a reactor in which the vapor distilled off and containing trioxane is contacted in a distillation column with a liquid reaction mixture which has already been substantially completely reacted.

---

This invention relates to a process for the production of 1,3,5-trioxane (hereinafter referred to as trioxane) from formaldehyde in the presence of acid catalysts with a high space-time yield and decreased consumption of energy.

Production of trioxane by trimerization of formaldehyde has been known for a long time (cf. Walker, Formaldehyde, Reinhold Publ., New York, 3rd edition, 1964, pp. 198–199). Usually trioxane is produced from concentrated aqueous formaldehyde solution at elevated temperature in the presence of acid catalysts and removed from the reaction mixture by distillation. The product vapor contains not only trioxane but also formaldehyde, water, impurities from the feedstock and byproducts of the synthesis, and is usually distilled (as described in U.S. patent specification No. 2,304,080) in a fractionating column attached to the reactor or (as described in U.S. patent specification No. 3,325,513) in a column having a fractionating section and a reboiler section. The fraction high in trioxane is then further processed by extraction and/or another conventional process of separation.

In the known methods of this type, the space-time yields achieved are not higher than 175 g. of trioxane per kg. of formaldehyde per hour. In the process of German patent Specification No. 1,135,491, the maximum space-time yield is 152 g. of trioxane per kg. of formaldehyde per hour. In a Russian article on the rate of formation of trioxane (Zhur.priklad.Khim 37, 1620 (1964)), the maximum space-time yields are given as 175 g. of trioxane per kg. of formaldehyde per hour. It is a disadvantage of these processes that relatively long residence times in the reactor and large reactor volumes are required for the commercial manufacture of trioxane from aqueous formaldehyde solutions.

To obtain the highest possible space-time yields in the synthesis of trioxane it has already been proposed to disturb the chemical equilibrium between formaldehyde and trioxane in the reaction mixture as much as possible by high rates of evaporation, i.e. to keep the concentration of trioxane in the reaction mixture as low as possible. The result is, however, that the product vapor also has a low concentration of trioxane and more power is required to concentrate the trioxane by rectification.

It is the object of this invention to provide a process for the production of 1,3,5-trioxane that can be carried out continuously, in which the residence time of the reaction mixture in the reactor is short and which gives high space-time yields without requiring more energy than prior processes. The product vapor escaping from the reactor should have a high trioxane content.

In accordance with this invention this and other objects and advantages are achieved by maintaining the catalyst concentration in the reaction mixture at from 2 to 25%, advantageously 2 to 15%, by weight of a mineral acid or such an amount of another acid catalyst that the catalytic activity is the same, maintaining a mean residence time of the aqueous formaldehyde solution in the reactor of from two minutes to two hours, advantageously from two to fifteen minutes, and passing the product gas containing trioxane leaving the reactor in a column having at least one theoretical tray, advantageously from one to three theoretical trays, countercurrent to a substantially fully reacted reaction mixture.

By carrying out the reaction in the said manner at high rates of evaporation in the reactor and the said minimum concentrations of acid catalyst in the reaction mixture, the space-time yield can be increased to more than 1000 g. of trioxane per kg. of formaldehyde per hour without the trioxane content of the product vapor falling below its equilibrium value at low rates of evaporation, i.e. without additional power consumption in the rectification of the product vapor.

A very advantageous embodiment of the process comprises passing the trioxane-containing product vapor leaving the reactor countercurrent in a column to a liquid stream of reaction mixture from the reactor which has a residence time of at least one minute between leaving the reactor and entering the column or coming into contact with the product vapor.

The product vapor having a higher concentration of trioxane which results after the contacting in the column may be further processed by rectification and/or another conventional method of separation, aqueous formaldehyde solution having a lower content of trioxane which thus results being returned with advantage to the reactor.

The reaction mixture usually contains 30 to 70%, particularly 50 to 65%, by weight of formaldehyde or paraformaldehyde, about 70 to 30%, particularly 50 to 35%, by weight of water, if desired conventional additives such as antifoams and, as acid catalyst, 2 to 25%, particularly 2 to 15%, by weight of a mineral acid or an amount of another conventional acid catalyst equivalent to this acid content in catalytic activity. The critical factor in achieving high space-time yields by the process is solely the amount, i.e. the catalytic activity, of the acid catalyst used, and not usually its type. Naturally only catalysts will be used which are less volatile than the mixture formed. Sulfuric acid is the preferred mineral acid, but phosphoric acid, for example, is also well suited. Instead of mineral acids, other conventional acid catalysts may be used whose catalytic activity is known or can easily be determined. Examples of these other catalysts are acid salts, such as potassium hydrogen sulfate or zinc chloride, aliphatic and aromatic sulfonic acids, such as p-toluenesulfonic acid or 1,5-naphthalenedisulfonic acid, and acid ion exchangers, such as commercially available cation exchanger resins having $SO_3H$ radicals.

The mixture is boiled in the reactor and pressures above or below atmospheric may be used if desired. In some cases it is advantageous to use pressures of up to 10 atmospheres, in particular from 2 to 4 atmospheres. Reactors of conventional design, for example stirred vessels, may be used. A feature of the process according to this invention is the short mean residence time of the aqueous formaldehyde solution in the reactor of two minutes to two hours, particularly two to fifteen minutes. The mean residence time can easily be determined from the ratio of the amount of reaction mixture contained in the reactor to the amount of distillate leaving the reactor per unit of time. Circulating evaporators have proved to be especially suitable as reactors because a large amount of heat has to be supplied to achieve the necessary high rates of distillation.

The product vapor escaping from the reactor and containing trioxane is passed, while avoiding reflux into the reactor if possible, through a column having at least one theoreticaly tray, preferably one to ten and particularly one to three theoretical trays, which is arranged on top of the reactor or is separate therefrom, and is contacted in the column with substantially completely reacted reaction mixture. The liquid withdrawn from the column flows back into the reactor. Product vapor high in trioxane is in general withdrawn at the top of the column, the trioxane content of the same being determined by the equilibrium between the reactants on the one hand and the liquid-gas equilibrium on the other hand. The reaction mixture flowing countercurrent to or cocurrent with the product vapor should be substantially or completely reacted, i.e. the reaction equilibruim should be practically established.

The substantially reacted reaction mixture may originate from a separately prepared batch, from an earlier batch, or from the same batch. It has proved to be particularly advantageous for a recycle stream of reaction mixture to flow countercurrent or cocurrent with the product vapor provided that the path of the reaction mixture from the reactor to the point of entry into the column, advantageously at the top of the column, ensures a minimum residence time of one minute, advantageously of from one to five minutes, because otherwise the trioxane content of the product vapor falls below the equilibrium value. The necessary residence time depends on the reaction conditions, such as temperature and formaldehyde, trioxane and catalyst concentrations, but it can be readily determined. The temperature of the substantially fully reacted mixture supplied to the column should advantageously not be much less than the temperature of the vapor rising in the column in order to avoid unnecessary reflux and increased heat consumption in the reactor. Temperatures of the reaction mixture introduced into the column of 5° to 10° C. below the temperature of the poduct vapor have often proved to be advantageous. The amount of substantially reacted reaction mixture contacted with the product vapor depends on the irrigation rate required for high tray efficiency in the column and consequently depends on the type of column inserts and the loading of the column. In general it is from 0.2 times to 10 times and particularly from 0.5 times to twice the amount of product vapor passed through.

The trioxane-rich vapor leaving the top of the column may be concentrated (either as vapor or after condensation) by rectification and/or one or more further separating steps or processed into pure trioxane. When rectification follows the synthesis, it is advantageous to use a column having a rectifying section and a stripping section. A trioxane-rich mixture of trioxane, formaldehdye and water is drawn off from the top of the column and this may contain small amounts of impurities from the feedstock, for example methanol, or byproducts from the synthesis, as for example acetals, esters and acids. From the stripping section of the column there is obtained an aqueous formaldehyde solution which is low in trioxane or contains none at all, and this can be recycled to the reactor and added to the reaction mixture.

The process for the synthesis of trioxane according to this invention may easily be carried out continuously. If an amount of water is distilled off at the top of the rectification column with the trioxane equal to that supplied to the reactor by adding fresh formaldehyde solution, then water does not accumulate in the reaction system and concentrations do not occur in the reaction mixture.

Another advantage of the process according to this invention is the fact that surprisingly high space-time yields of more than 1000 g. of trioxane per kg. of formaldehdye per hour can be achieved by using it; these yields are about six times higher than the highest values known in the art and the values given in the literature as to the rate of formation of trioxane. With such high space-time yields, only relatively small reactor volumes are required for commercial manufacture. Yields of 1000 g. of trioxane per kg. of formaldehyde per hour do not constitute an upper limit for the space-time yield in the process according to this invention. In practice the space-time yield is limited by the possibility of supplying to the reactor the heat energy required to maintain the high distillation rates.

It is stated in German patent specification No. 1,135,491 that an increased concentration of mineral acid results in an increased formation of byproducts and consequently in a decreased yield of trioxane. The process according to this invention, in spite of the high acid concentration, surprisingly gives a high yield of trioxane and an extremely small amount of byproducts. Moreover it is possible to obtain high space-time yields at relatively low acid concentrations to meet the exacting requirements as to the purity of the trioxane.

A particular advantage of the process according to this invention is the fact that independently of the rate of distillation the content of trioxane in the effluent product vapor is at a maximum otherwise obtainable only at very low distillation rates and space-time yields or by rectification after additional supply of heat. The fact that the content of trioxane is independent of the rate of distillation is shown by a comparison of Examples 1 and 2. In Example 1 a relatively low rate of distillation is used which is increased threefold in Example 2 without the content of trioxane in the vapor falling off.

The invention is further illustrated by the following examples in which the parts and percentages specified are by weight.

EXAMPLE 1

Apparatus as shown diagrammatically in the drawing is used. The reactor consists of the base of column A and a circulating evaporator B. Column C has five bubble trays, i.e. about four theoretical trays.

90 parts of a 60.0% aqueous technical formaldehyde solution and 10 parts of concentrated sulfuric acid (96%) are introduced into the reactor through line D. The reaction mixture is boiled and the reaction mixture is pumped from the reactor by means of pump E at a rate of about 200 parts per hour into the top of column C. The heat output of the circulating evaporator B is adjusted so that 100 parts of distillate is obtained per hour. At the same time 100 parts of a 60.0% aqueous technical formaldehyde solution is continuously metered per hour into the bottom A of the column so that there is always 100 parts of reaction mixture in the reactor.

The 100 parts of distillate obtained per hour at the top of column C contains 20.1% of trioxane, 39.7% of formaldehdye, 38.8% of water and traces of methylal.

The mean residence time of the aqueous formaldehyde solution in the reactor is sixty minutes, the conversion of formaldehyde is 33.8%, the yield of trioxane (with reference to the amount of formaldehyde reacted) is 99.0% of the theory, and the space-time yields is 370 g. of trioxane per kg. of formaldehyde per hour.

EXAMPLE 2

90 parts of a 63.5% aqueous technical formaldehyde solution and 10 parts of concentrated (96%) sulfuric acid are introduced through line D into the reactor of the apparatus shown in the drawing. After the reaction mixture has been heated to boiling point, it is pumped at a rate of about 150 parts per hour to the top of column C and the heat output of the circulating evaporator B is adjusted so that 300 parts of distillate is obtained per hour. At the same time, 300 parts per hour of a 63.5% aqueous technical formaldehyde solution is introduced continuously into the bottom A of the column so that there is always 100 parts of reaction mixture in the reactor.

The 300 parts of distillate obtained per hour at the top of the column contains 20.8% of trioxane, 42.4% of formaldehyde, 35.0% of water and traces of methylal.

The mean residence time of the aqueous formaldehyde solution in the reactor is twenty minutes, the conversion of formaldehyde is 33.1%, the yield of trioxane (with reference to the amount of formaldehyde reacted) is 98.6% of the theory, and the space-time yield is 1090 g. of trioxane per kg. of formaldehyde per hour.

Comparison test

The process of Example 2 is repeated but in a reactor not having a column C or a recirculation line. As in Example 2, 90 parts of 63.5% aqueous technical formaldehyde and 10 parts of concentrated sulfuric acid are placed in the reactor, the reaction mixture is heated to the boiling point and 300 parts per hour is distilled off. Once distillation has commenced, 300 parts per hour of a 63.5% aqueous technical formaldehyde solution is continuously metered into the reactor at the same time.

The effluent product vapor contains only 16.5% of trioxane with 46.7% of formaldehyde and 34.9% of water.

The conversion of formaldehyde is only 26.5%, the yield of trioxane (with reference to the amount of formaldehyde reacted) is 98.2% of the theory and the space-time yield is 870 g. of trioxane per kg. of formaldhyde per hour.

We claim:

1. In a process for the production of trioxane by heating aqueous formaldehyde solution in the presence of an acid catalyst in a reactor while removing the product gas containing trioxane from the reactor, the improvement which comprises maintaining the concentration of catalyst in the reaction mixture at from 2 to 25% by weight of a mineral acid or an amount of another acid catalyst equivalent to this acid content in catalytic activity, maintaining a mean residence time of the aqueous formaldehyde solution in the reactor of from two minutes to two hours, and contacting the product vapor containing trioxane which leaves the reactor with substantially completely reacted reaction mixture in a column having at least one theoretical tray.

2. A process as claimed in claim 1 wherein the said column has one to ten theoretical trays.

3. A process as claimed in claim 1 wherein the said column has one to three theoretical trays.

4. A process as claimed in claim 1 wherein the concentration of catalyst in the reaction mixture is 2 to 15% by weight of mineral acid.

5. A process as claimed in claim 1 wherein the reaction mixture is at least partly circulated from the reactor to the column, the period between leaving the reactor and contact with the product vapor in the column being at least one minute.

6. A process as claimed in claim 1 wherein the mineral acid used is sulfuric acid.

7. A process as claimed in claim 1 wherein the mean residence time of the formaldehyde solution in the reactor is from two to fifteen minutes.

References Cited
UNITED STATES PATENTS 3,378,468   4/1968   Langecker _____ 260—340

NORMA S. MILESTONE, Primary Examiner